Figure 1:
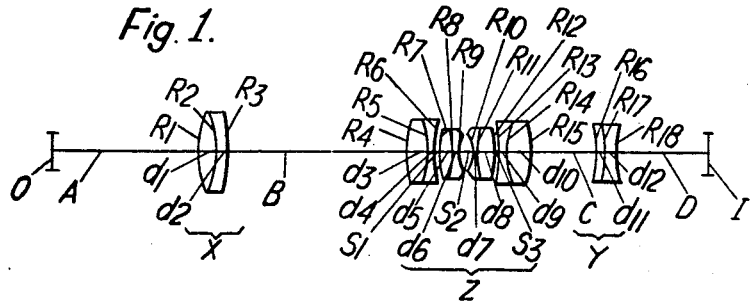

Dec. 8, 1959           G. H. COOK           2,915,942

ANAMORPHOTIC OPTICAL SYSTEMS

Filed March 3, 1958           3 Sheets—Sheet 1

Inventor
Gordon H. Cook
By
Attorneys

Inventor
G. H. Cook
By
Attorneys

Dec. 8, 1959   G. H. COOK   2,915,942
ANAMORPHOTIC OPTICAL SYSTEMS
Filed March 3, 1958   3 Sheets—Sheet 3

Inventor
Gordon H. Cook
By
Attorneys

United States Patent Office 2,915,942
Patented Dec. 8, 1959

2,915,942
ANAMORPHOTIC OPTICAL SYSTEMS

Gordon Henry Cook, Leicester, England, assignor to Taylor, Taylor & Hobson Limited, Leicester, England, a British company Application March 3, 1958, Serial No. 718,706
Claims priority, application Great Britain April 7, 1954
8 Claims. (Cl. 88—57)

This application is in part a continuation of the present applicant's application Serial No. 451,568, filed August 23, 1954, now Patent No. 2,832,262, dated April 29, 1958.

This invention relates to an anamorphotic optical system, more especially intended for effecting lateral compression or expansion of an image. A system of cylindrical or prismatic components has been used in conjunction with a photographic objective for enabling an unusually wide panoramic view to be photographed on to a film picture frame of normal size, and a similar system has been used in conjunction with a projection objective whereby the same film with the laterally compressed image is projected on to a wide screen, the lateral expansion afforded by the anamorphotic system bringing the screen image back again to the aspect ratio of the original wide panoramic view. In such instance, the two conjugates, respectively on the object and image sides, are widely different, thus providing considerable magnification in projection and reduction in photographing. With such arrangements, minor modifications in component separation are necessary to accommodate small changes in the long conjugate distance to maintain simultaneous focus in the two meridians of the object and image planes, but since such modifications introduce aberration and, in the case of cylindrical systems, also change the compression ratio, they are necessarily very limited in extent.

In some instances, however, it is desired to use anamorphotic components in conjunction with a copying objective operating at or near unity magnification, or some other objective with relatively small magnification, and it is not practicable to meet such requirements by altering the dimensions of the above-mentioned systems. It has been proposed, in such case, to employ an anamorphotic system comprising two convergent cylindrical components with their generators at right angles to one another, the two components being so disposed that the object and image planes of one of them in its plane of operation are coincident with those of the other in its plane of operation, their magnifications however being different, so that the effective magnifications of the complete system in the two operative planes are different from one another. This arrangement however requires complex cylindrical components in order to achieve the desired high standard of definition at useful apertures and is therefore difficult to design and expensive to manufacture.

The present invention has for its object to provide an improved anamorphotic system, suitable for such purposes, which will give a high standard of performance at wide apertures whilst using simple cylindrical components.

For this purpose, the invention makes use of a type of anamorphotic system which has been proposed giving different magnifications in two mutually perpendicular planes for the same conjugate planes, and comprising two members having cylindrical surfaces with their generators parallel to one another, one being divergent and the other convergent, and a convergent member having spherical surfaces interposed between the two cylindrical members.

In the anamorphotic system of such kind according to the invention, the arithmetic mean between the positive values of the equivalent focal lengths of the two cylindrical members preferably bears a ratio to the equivalent focal length of the spherical member lying between 0.4 and 1.2 times the ratio of the greater of the two magnifications to the difference between such magnifications. The axial magnification of the convergent cylindrical member preferably lies between 0.8P and 1.6P and the axial magnification of the divergent cylindrical member between 0.6P and 1.2P, where P is the compression or expansion ratio of the complete system.

Each cylindrical member is preferably compound including at least one convergent element and at least one divergent element, the convergent cylindrical member including at least one dispersive internal contact and having its outermost surface remote from the spherical member convex, whilst the divergent cylindrical member includes at least one collective internal contact and has its innermost surface facing the spherical member concave.

It should be made clear that the term "internal contact" as herein used is intended to include not only a cemented internal contact, but also what is commonly termed a "broken contact," wherein the two engaging surfaces have slightly different radii of curvature. In the case of a "broken contact," the power of the contact is the harmonic mean between the powers of the two engaging surfaces.

The radius of curvature in the operative plane of the outermost surface of the convergent cylindrical member may conveniently lie between $0.75f_2$ and $1.75f_2$ and that of the innermost surface of the divergent cylindrical member between $0.5f_2$ and $1.75f_2$, where $f_2$ is the equivalent focal length of the spherical member.

Each cylindrical member may conveniently comprise a doublet, the dispersive internal contact in the convergent member having Petzval curvature between $-0.1$ and $-0.4$ times the sum of the Petzval curvatures of the two outer surfaces of such convergent member, whilst the collective internal contact in the divergent member has Petzval curvature between $+0.1$ and $-0.4$ times the sum of the Petzval curvatures of the two outer surfaces of such divergent member, the Petzval curvature of a surface being defined by the expression $(n^1-n)/n^1nr$, where $r$ is the radius of curvature of the surface in the operative plane and $n$ and $n^1$ are the mean refractive indices of the materials on the two sides of such surface.

The invention may be carried into practice in various ways but some convenient alternative arrangements of fully corrected anamorphotic optical system according thereto are illustrated in the accompanying drawings, in which—

Figure 1A:
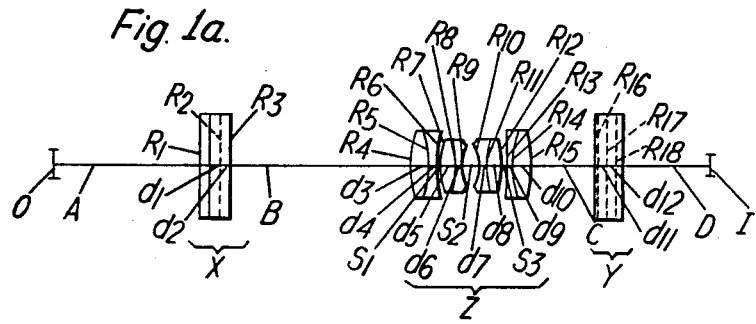
Figure 2:
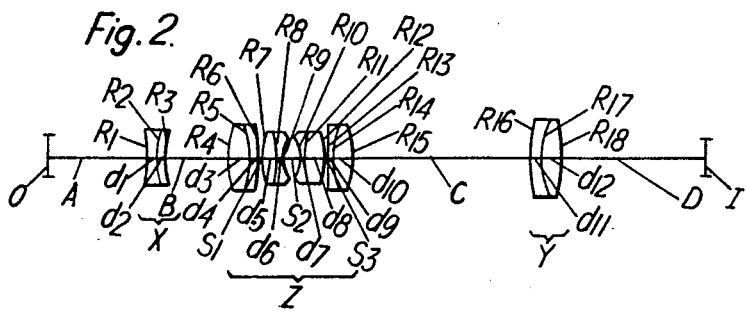
Figure 2A:
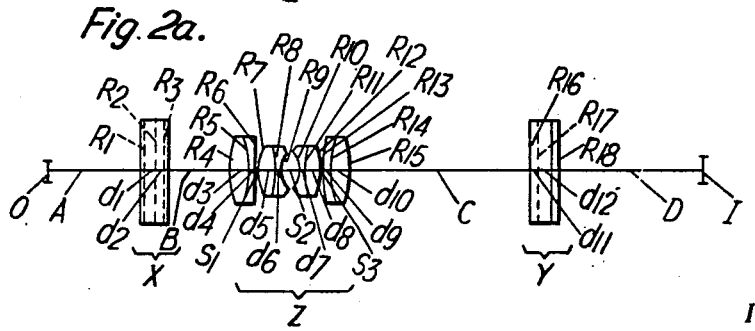

Figures 1 and 1a respectively show diagrammatic views in the two operative planes at right angles to one another of one arrangement corresponding to that of Example VI of Patent No. 2,832,262, and is included for convenience in explaining the relationship of the several embodiments of the invention herein illustrated;

Figures 2 and 2a and Figures 3 and 3a are similar views respectively illustrating two inversions of the arrangement of Figures 1 and 1a, and Figures 4 and 4a, and 5 and 5a, respectively, show two further arrangements.

Numerical data for each of these five arrangements are given in the tables below. In these tables, the first column gives a reference letter indicative of a surface defined by its radius of curvature, or of an air space defined by its axial length, or of a lens element defined by its axial thickness and also by its glass characteristics. The radius of curvature at the axial vertex of a cylindrical surface of course varies in different axial planes between a maximum value in one operative plane and a minimum value in the other operative plane. The second and third columns give the values of the radii and axial distances appropriate to the reference letters of the first column in terms of an arbitrary unit, respectively in the two operative planes. Usually, plane I shown in the second column will be the horizontal plane and plane II shown in the third column the vertical plane, but this is not essentially so in all cases. The mean refractive index $n_d$ for the $d$-line and the Abbé V number of each of the materials used for the individual elements are given respectively in the fourth and fifth columns.

The various air spaces, whose axial lengths are given in the second and third columns, are indicated in the first column by the following reference letters: A, from the front conjugate plane O to the front surface of the front cylindrical member X; B, between the rear surface of the front cylindrical member X and the front surface of the spherical member Z; C, between the rear surface of the spherical member Z and the front surface of the rear cylindrical member Y; D, from the rear surface of the rear cylindrical member Y to the rear conjugate plane I; and $S_1$, $S_2$, $S_3$ respectively between the individual components of the spherical member Z. The various lens elements, whose axial thicknesses are given in the second and third columns, are indicated in the first column respectively by the reference letters $d_1$, $d_2$, $d_3$ . . . . The various lens surfaces, the values of whose radii of curvature in the two operative planes are given respectively in the third and fourth columns, are indicated in the first column by the reference letters $R_1$, $R_2$, $R_3$ . . ., the positive sign indicating that the surface is convex to the front and the negative sign that it is concave thereto.

One important use for the anamorphotic system according to the invention is to constitute an anamorphotic copying objective system for producing an undistorted positive image for a distorted negative obtained by means of a photographic objective provided with an anamorphotic attachment giving a desired compression ratio. Examples with relatively small magnifications (the compression ratio being determined by that used in the photographing) may be used in this connection for cinematograph film printing on to conventional film stock, the scale of the positive image determining how much of the negative is reproduced in the printing and therefore also the aspect ratio of the final picture projected on to the cinematograph screen, such final projection of course not requiring an anamorphotic system. Examples with relatively large magnifications may be used for producing an undistorted large-scale "still" picture from the whole of an individual picture area of a laterally compressed cinematographic negative film.

Another use for the anamorphotic system according to the invention is in connection with a modified wide screen cinematographic system which has been proposed, wherein an anamorphosis is avoided altogether at the camera stage by the use of wider negative films and wider angle camera objectives, but is introduced in printing on to conventional positive film stock in readiness for projection by means of a projection objective fitted with an anamorphotic attachment. This proposal has the advantage that the anamorphosis can be introduced more conveniently and with a higher level of definition. The anamorphotic system according to the present invention is very suitable for such anamorphosis at the printing stage, the system being used in the opposite sense to that above described, that is to say either back to front or with the system rotated through a right angle about the optical axis. Either of these inversions will give the smaller magnification in plane I of the examples and the larger magnification in plane II.

Thus, in the examples described in detail below, Example II has been derived from Example I by turning it from end to end, whilst Example III has been derived from Example I by turning it through a right angle. Example I is intended for producing an undistorted image from a distorted object, whilst Examples II and III are intended for producing a distorted image from an undistorted object.

Examples IV and V are further variants giving different compression ratios. Example IV may be regarded as a variant of Example III with a compression ratio of 1.333, whilst Example V may be regarded as a variant of Example I but with a compression ratio of 1.5, both being suitably corrected for abberation and capable of giving a high standard of performance.

*Example I (Figures 1 and 1a)*

| Reference Letter | Plane I (Fig. 1) | Plane II (Fig. 1a) | Refractive Index $n_d$ | Abbé V Number |
|---|---|---|---|---|
| A | 3.776 | 3.776 | | |
| $R_1$ | +4.4467 | ∞ | | |
| $d_1$ | 0.501 | 0.501 | 1.54769 | 45.6 |
| $R_2$ | −2.0237 | ∞ | | |
| $d_2$ | 0.228 | 0.228 | 1.70035 | 30.3 |
| $R_3$ | −7.6067 | ∞ | | |
| B | 4.648 | 4.648 | | |
| $R_4$ | +2.5442 | +2.5442 | | |
| $d_3$ | 0.569 | 0.569 | 1.69100 | 54.8 |
| $R_5$ | −1.7742 | −1.7742 | | |
| $d_4$ | 0.182 | 0.182 | 1.61200 | 44.9 |
| $R_6$ | +16.7221 | +16.7221 | | |
| $S_1$ | 0.009 | 0.009 | | |
| $R_7$ | +1.2784 | +1.2784 | | |
| $d_5$ | 0.455 | 0.455 | 1.57220 | 57.7 |
| $R_8$ | −3.6067 | −3.6067 | | |
| $d_6$ | 0.137 | 0.137 | 1.61590 | 44.5 |
| $R_9$ | +0.8429 | +0.8429 | | |
| $S_2$ | 0.455 | 0.455 | | |
| $R_{10}$ | −0.8871 | −0.8871 | | |
| $d_7$ | 0.137 | 0.137 | 1.61590 | 44.5 |
| $R_{11}$ | +4.3804 | +4.3804 | | |
| $d_8$ | 0.455 | 0.455 | 1.57220 | 57.7 |
| $R_{12}$ | −1.2802 | −1.2802 | | |
| $S_3$ | 0.043 | 0.043 | | |
| $R_{13}$ | −16.2258 | −16.2258 | | |
| $d_9$ | 0.182 | 0.182 | 1.61200 | 44.9 |
| $R_{14}$ | +1.6193 | +1.6193 | | |
| $d_{10}$ | 0.569 | 0.569 | 1.69100 | 54.8 |
| $R_{15}$ | −2.5650 | −2.5650 | | |
| C | 1.700 | 1.700 | | |
| $R_{16}$ | −4.1690 | ∞ | | |
| $d_{11}$ | 0.228 | 0.228 | 1.70035 | 30.3 |
| $R_{17}$ | −1.8973 | ∞ | | |
| $d_{12}$ | 0.228 | 0.228 | 1.55154 | 63.5 |
| $R_{18}$ | +5.0516 | ∞ | | |
| D | 2.498 | 2.498 | | |

*Example II (Figures 2 and 2a)*

| Reference Letter | Plane I (Fig. 2) | Plane II (Fig. 2a) | Refractive Index $n_d$ | Abbé V Number |
|---|---|---|---|---|
| A | 2.498 | 2.498 | | |
| $R_1$ | −5.0516 | ∞ | | |
| $d_1$ | 0.228 | 0.228 | 1.55154 | 63.5 |
| $R_2$ | +1.8973 | ∞ | | |
| $d_2$ | 0.228 | 0.228 | 1.70035 | 30.3 |
| $R_3$ | +4.1690 | ∞ | | |
| B | 1.700 | 1.700 | | |
| $R_4$ | +2.5650 | +2.5650 | | |
| $d_3$ | 0.569 | 0.569 | 1.69100 | 54.8 |
| $R_5$ | −1.6193 | −1.6193 | | |
| $d_4$ | 0.182 | 0.182 | 1.61200 | 44.9 |
| $R_6$ | +16.2258 | +16.2258 | | |
| $S_1$ | 0.043 | 0.043 | | |
| $R_7$ | +1.2802 | +1.2802 | | |
| $d_5$ | 0.455 | 0.455 | 1.57220 | 57.7 |
| $R_8$ | −4.3804 | −4.3804 | | |
| $d_6$ | 0.137 | 0.137 | 1.61590 | 44.5 |
| $R_9$ | +0.8871 | +0.8871 | | |
| $S_2$ | 0.455 | 0.455 | | |
| $R_{10}$ | −0.8429 | −0.8429 | | |
| $d_7$ | 0.137 | 0.137 | 1.61590 | 44.5 |
| $R_{11}$ | +3.6067 | +3.6067 | | |
| $d_8$ | 0.455 | 0.455 | 1.57220 | 57.7 |
| $R_{12}$ | −1.2784 | −1.2784 | | |
| $S_3$ | 0.009 | 0.009 | | |
| $R_{13}$ | −16.7221 | −16.7221 | | |
| $d_9$ | 0.182 | 0.182 | 1.61200 | 44.9 |
| $R_{14}$ | +1.7742 | +1.7742 | | |
| $d_{10}$ | 0.569 | 0.569 | 1.69100 | 54.8 |
| $R_{15}$ | −2.5442 | −2.5442 | | |
| C | 4.648 | 4.648 | | |
| $R_{16}$ | +7.6067 | ∞ | | |
| $d_{11}$ | 0.228 | 0.228 | 1.70035 | 30.3 |
| $R_{17}$ | +2.0237 | ∞ | | |
| $d_{12}$ | 0.501 | 0.501 | 1.54769 | 45.6 |
| $R_{18}$ | −4.4467 | ∞ | | |
| D | 3.776 | 3.776 | | |

Figure 3:
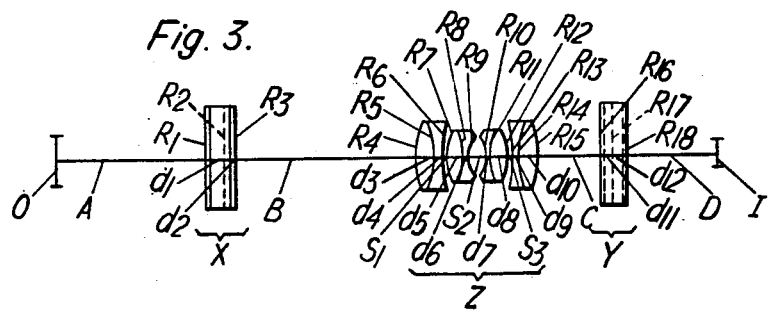
Figure 3A:
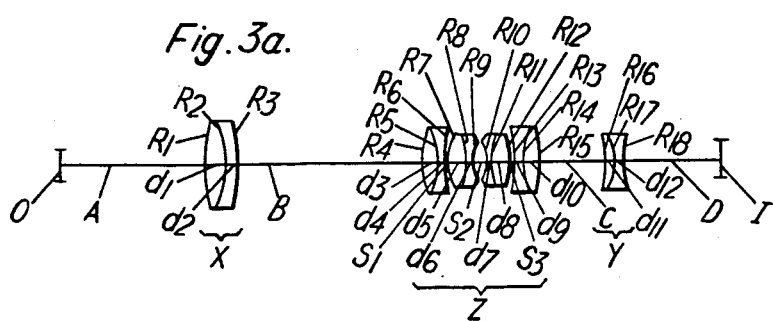

Example III (Figures 3 and 3a)

| Reference Letter | Plane I (Fig. 3) | Plane II (Fig. 3a) | Refractive Index $n_d$ | Abbé V Number |
|---|---|---|---|---|
| A | 3.776 | 3.776 | | |
| $R_1$ | ∞ | +4.4467 | | |
| $d_1$ | 0.501 | 0.501 | 1.54769 | 45.6 |
| $R_2$ | ∞ | −2.0237 | | |
| $d_2$ | 0.228 | 0.228 | 1.70035 | 30.3 |
| $R_3$ | ∞ | −7.6067 | | |
| B | 4.648 | 4.648 | | |
| $R_4$ | +2.5442 | +2.5442 | | |
| $d_3$ | 0.569 | 0.569 | 1.69100 | 54.8 |
| $R_5$ | −1.7742 | −1.7742 | | |
| $d_4$ | 0.182 | 0.182 | 1.61200 | 44.9 |
| $R_6$ | +16.7221 | +16.7221 | | |
| $S_1$ | 0.009 | 0.009 | | |
| $R_7$ | +1.2784 | +1.2784 | | |
| $d_5$ | 0.455 | 0.455 | 1.57220 | 57.7 |
| $R_8$ | −3.6067 | −3.6067 | | |
| $d_6$ | 0.137 | 0.137 | 1.61590 | 44.5 |
| $R_9$ | +0.8429 | +0.8429 | | |
| $S_2$ | 0.455 | 0.455 | | |
| $R_{10}$ | −0.8871 | −0.8871 | | |
| $d_7$ | 0.137 | 0.137 | 1.61590 | 44.5 |
| $R_{11}$ | +4.3804 | +4.3804 | | |
| $d_8$ | 0.455 | 0.455 | 1.57220 | 57.7 |
| $R_{12}$ | −1.2802 | −1.2802 | | |
| $S_3$ | 0.043 | 0.043 | | |
| $R_{13}$ | −16.2258 | −16.2258 | | |
| $d_9$ | 0.182 | 0.182 | 1.61200 | 44.9 |
| $R_{14}$ | +1.6193 | +1.6193 | | |
| $d_{10}$ | 0.569 | 0.569 | 1.69100 | 54.8 |
| $R_{15}$ | −2.5650 | −2.5650 | | |
| C | 1.700 | 1.700 | | |
| $R_{16}$ | ∞ | −4.1690 | | |
| $d_{11}$ | 0.228 | 0.228 | 1.70035 | 30.3 |
| $R_{17}$ | ∞ | −1.8973 | | |
| $d_{12}$ | 0.228 | 0.228 | 1.55154 | 63.5 |
| $R_{18}$ | ∞ | +5.0516 | | |
| D | 2.498 | 2.498 | | |

Figure 4:
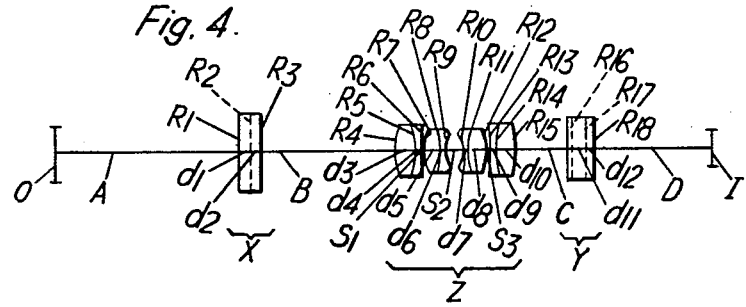
Figure 4A:
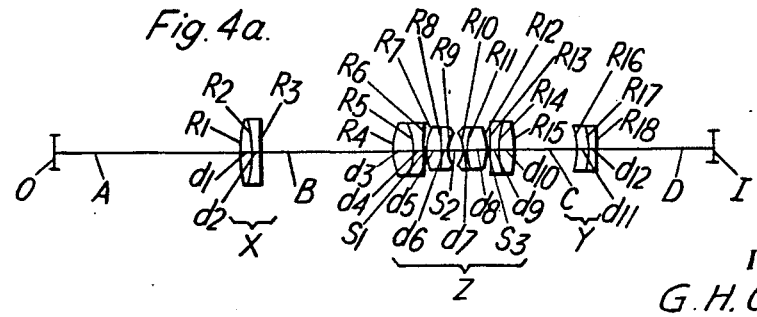

Example IV (Figures 4 and 4a)

| Reference Letter | Plane I (Fig. 6) | Plane II (Fig. 6a) | Refractive Index $n_d$ | Abbé V Number |
|---|---|---|---|---|
| A | 4.784 | 4.784 | | |
| $R_1$ | ∞ | +5.676 | | |
| $d_1$ | 0.313 | 0.313 | 1.51507 | 56.4 |
| $R_2$ | ∞ | −4.157 | | |
| $d_2$ | 0.193 | 0.193 | 1.70000 | 41.2 |
| $R_3$ | ∞ | −39.907 | | |
| B | 3.471 | 3.471 | | |
| $R_4$ | +2.491 | +2.491 | | |
| $d_3$ | 0.530 | 0.530 | 1.69100 | 54.8 |
| $R_5$ | −1.861 | −1.861 | | |
| $d_4$ | 0.193 | 0.193 | 1.61590 | 44.5 |
| $R_6$ | +12.551 | +12.551 | | |
| $S_1$ | 0.010 | 0.010 | | |
| $R_7$ | +1.321 | +1.321 | | |
| $d_5$ | 0.424 | 0.424 | 1.56938 | 55.8 |
| $R_8$ | −4.190 | −4.190 | | |
| $d_6$ | 0.144 | 0.144 | 1.61590 | 44.5 |
| $R_9$ | +0.8971 | +0.8971 | | |
| $S_2$ | 0.482 | 0.482 | | |
| $R_{10}$ | −0.9384 | −0.9384 | | |
| $d_7$ | 0.144 | 0.144 | 1.6137 | 43.9 |
| $R_{11}$ | +4.190 | +4.190 | | |
| $d_8$ | 0.424 | 0.424 | 1.56938 | 55.8 |
| $R_{12}$ | −1.321 | −1.321 | | |
| $S_3$ | 0.0094 | 0.0094 | | |
| $R_{13}$ | −20.725 | −20.725 | | |
| $d_9$ | 0.193 | 0.193 | 1.61590 | 44.5 |
| $R_{14}$ | +1.714 | +1.714 | | |
| $d_{10}$ | 0.530 | 0.530 | 1.69100 | 54.8 |
| $R_{15}$ | −2.705 | −2.705 | | |
| C | 1.532 | 1.532 | | |
| $R_{16}$ | ∞ | −6.587 | | |
| $d_{11}$ | 0.313 | 0.313 | 1.70035 | 30.3 |
| $R_{17}$ | ∞ | −4.157 | | |
| $d_{12}$ | 0.203 | 0.203 | 1.50970 | 64.4 |
| $R_{18}$ | ∞ | +72.696 | | |
| D | 3.042 | 3.042 | | |

Figure 5:
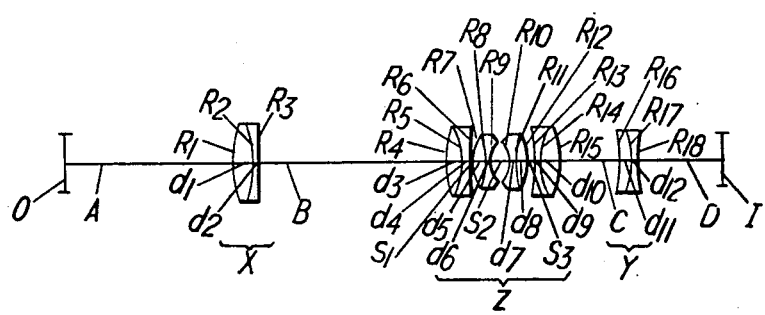
Figure 5A:
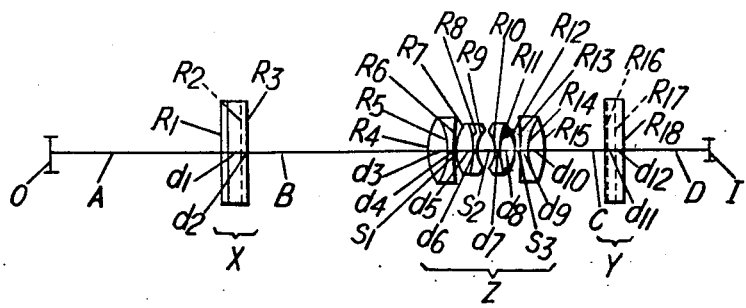

Example V (Figures 5 and 5a)

| Reference Letter | Plane I (Fig. 7) | Plane II (Fig. 7a) | Refractive Index $n_d$ | Abbé V Number |
|---|---|---|---|---|
| A | 4.469 | 4.469 | | |
| $R_1$ | +4.7450 | ∞ | | |
| $d_1$ | 0.451 | 0.451 | 1.51507 | 56.35 |
| $R_2$ | −2.5763 | ∞ | | |
| $d_2$ | 0.180 | 0.180 | 1.70000 | 41.18 |
| $R_3$ | −14.210 | ∞ | | |
| B | 4.741 | 4.741 | | |
| $R_4$ | +2.3324 | +2.3324 | | |
| $d_3$ | 0.496 | 0.496 | 1.69100 | 54.80 |
| $R_5$ | −1.7060 | −1.7060 | | |
| $d_4$ | 0.180 | 0.180 | 1.61710 | 44.40 |
| $R_6$ | +11.8120 | +11.8120 | | |
| $S_1$ | 0.009 | 0.009 | | |
| $R_7$ | +1.2352 | +1.2352 | | |
| $d_5$ | 0.397 | 0.397 | 1.56806 | 55.99 |
| $R_8$ | −3.6825 | −3.6825 | | |
| $d_6$ | 0.135 | 0.135 | 1.61710 | 44.40 |
| $R_9$ | +0.8395 | +0.8395 | | |
| $S_2$ | 0.451 | 0.451 | | |
| $R_{10}$ | −0.8858 | −0.8858 | | |
| $d_7$ | 0.136 | 0.136 | 1.61710 | 44.40 |
| $R_{11}$ | +3.6825 | +3.6825 | | |
| $d_8$ | 0.397 | 0.397 | 1.56806 | 55.99 |
| $R_{12}$ | −1.2352 | −1.2352 | | |
| $S_3$ | 0.065 | 0.065 | | |
| $R_{13}$ | −19.485 | −19.485 | | |
| $d_9$ | 0.180 | 0.180 | 1.61710 | 44.40 |
| $R_{14}$ | +1.5105 | +1.5105 | | |
| $d_{10}$ | 0.496 | 0.496 | 1.69100 | 54.80 |
| $R_{15}$ | −2.5290 | −2.5290 | | |
| C | 1.569 | 1.569 | | |
| $R_{16}$ | −5.5184 | ∞ | | |
| $d_{11}$ | 0.225 | 0.225 | 1.74842 | 29.85 |
| $R_{17}$ | −2.9858 | ∞ | | |
| $d_{12}$ | 0.158 | 0.158 | 1.51507 | 56.35 |
| $R_{18}$ | +10.074 | ∞ | | |
| D | 2.263 | 2.263 | | |

In all these examples, the spherical member (although it may in practice vary considerably in construction) is by way of example of a kind generally similar to that described in U.S. Patent No. 2,600,207, comprising two divergent meniscus inner components having their air-exposed surfaces concave to a diaphragm between them and two convergent outer components, each of the four components consisting of a doublet having a divergent inner element and a convergent outer element, the mean refractive index of the material of the divergent element in each inner component exceeding that of the associated convergent element by between .03 and .12, whilst the mean refractive index of the material of the convergent element in each outer component exceeds that of the associated divergent element by between .05 and .20. The spherical member is not, however, in this case in itself fully corrected, for the presence of the cylindrical members has to be taken into account in the aberration corrections. Thus, in the plane parallel to the generators of the cylindrical members, the thickness of the material of these members introduces aberrations, which are compensated for by appropriate modification of the dimensions of the spherical member. In the other operative plane, however, the spherical member has to operate at a magnification different from that for which the corrections are calculated in the first operative plane, and this introduces aberrations which are compensated for by those introduced by the cylindrical components. As has been mentioned, this construction for the spherical member has been given by way of example only, and in general it may be said that almost any of the well-known types of highly corrected objective can be modified for use as the spherical member in the present system. In particular, in order to achieve a good astigmatic correction in both planes, all the examples are such that the sum of the Petzval curvatures for all the surfaces of the spherical member lies between $+0.1/f_2$ and $-0.1/f_2$, where $f_2$ is the equivalent focal length of the spherical member, as will be clear from the table of comparative values set out below.

In all the examples, each cylindrical member consists of a doublet having a convergent element and a divergent element. The convergent cylindrical member has both its air-exposed surfaces convex and its internal contact is dispersive, whilst the divergent cylindrical member has its inner air-exposed surface concave and its internal contact is collective.

In Example I, the magnification in the first plane is 1.167 and that in the second plane 0.5835, so that the compression ratio is 2. The same magnifications of course apply also to Example III except that the larger magnification is in the second plane. In Example II, however, the magnifications are the inverses of those of Example I, so that the magnification in the first plane is 0.857 and that in the second plane is 1.714, the compression ratio still being 2. In Example IV, the magnification in the first plane is 0.642 and that in the second plane 0.855, the compression ratio being 1.333. In Example V, the magnification in the first plane is 0.7608 and that in the second plane 0.5074, the compression ratio being 1.5.

The relative aperture in the first three examples is $F/2.0$, and in the last two examples is $F/2.8$.

The following table sets out the comparative values for all the examples of a number of important dimensions. The symbols used in this table have the following meanings:

$F$ = the equivalent focal length of the complete system;
$f_1$ = the positive value of the equivalent focal length of the front cylindrical member;
$f_2$ = the equivalent focal length of the spherical member;
$f_3$ = the positive value of the equivalent focal length of the rear cylindrical member;
$X = (f_1 + f_3)/2f_2$;
$M_G$ = the greater of the magnifications of the complete system in the two planes;
$M_S$ = the smaller of the magnifications of the complete system in the two planes;
$K = M_G/(M_G - M_S)$;
$P = M_G/M_S$ = the compression or expansion ratio;
$M_C$ = the axial magnification of the convergent cylindrical member;
$M_D$ = the axial magnification of the divergent cylindrical member;
$R_C$ = the radius of curvature of the outermost surface of the convergent cylindrical member in the operative plane (that is $R_1$ or $R_{18}$ as the case may be);
$R_D$ = the radius of curvature of the innermost surface of the divergent cylindrical member in the operative plane (that is $R_3$ or $R_{16}$ as the case may be);
$p_{CI}$ = the Petzval curvature of the internal contact in the convergent cylindrical member;
$p_{DI}$ = the Petzval curvature of the internal contact in the divergent cylindrical member;
$p_{SC}$ = the sum of the Petzval curvatures of the outer surfaces of the convergent cylindrical member;
$p_{SD}$ = the sum of the Petzval curvatures of the outer surfaces of the divergent cylindrical member;
$p_S$ = the sum of the Petzval curvatures of all the surfaces of the spherical member.

|  | Ex. I | Ex. II | Ex. III | Ex. IV | Ex. V |
|---|---|---|---|---|---|
| $f_1/F$ | 7.220 | 4.983 | 7.220 | 15.613 | 11.555 |
| $f_2/F$ | 3.993 | 3.993 | 3.993 | 4.076 | 4.247 |
| $f_3/F$ | 4.983 | 7.220 | 4.983 | 14.988 | 9.226 |
| $M_G$ | 1.167 | 1.714 | 1.167 | 0.855 | 0.7608 |
| $M_S$ | 0.5835 | 0.857 | 0.5835 | 0.642 | 0.5074 |
| $K$ | 2 | 2 | 2 | 4.009 | 3 |
| $P$ | 2 | 2 | 2 | 1.333 | 1.5 |
| $p_{SC} \cdot F$ | +0.1337 | +0.1337 | +0.1337 | +0.0701 | +0.0970 |
| $p_{SD} \cdot F$ | −0.1691 | −0.1691 | −0.1691 | −0.0672 | −0.1082 |
| $X$ | 1.528 | 1.528 | 1.528 | 3.753 | 2.447 |
| $X/K$ | 0.764 | 0.764 | 0.764 | 0.936 | 0.816 |
| $M_C$ | 2.180 | 2.180 | 2.180 | 1.4345 | 1.6275 |
| $M_C/P$ | 1.090 | 1.090 | 1.090 | 1.076 | 1.085 |
| $M_D$ | 1.53 | 1.53 | 1.53 | 1.229 | 1.269 |
| $M_D/P$ | 0.765 | 0.765 | 0.765 | 0.922 | 0.846 |
| $R_C/F$ | 4.4467 | 4.4467 | 4.4467 | 5.676 | 4.746 |
| $R_C/f_2$ | 1.111 | 1.111 | 1.111 | 1.392 | 1.117 |
| $R_D/F$ | 4.169 | 4.169 | 4.169 | 6.587 | 5.519 |
| $R_D/f_2$ | 1.044 | 1.044 | 1.044 | 1.616 | 1.300 |
| $p_{CI} \cdot F$ | −0.0287 | −0.0287 | −0.0287 | −0.0173 | −0.0260 |
| $p_{CI}/p_{SC}$ | −0.215 | −0.215 | −0.215 | −0.247 | −0.268 |
| $p_{DI} \cdot F$ | +0.0297 | +0.0297 | +0.0297 | +0.0179 | +0.0279 |
| $p_{DI}/p_{SD}$ | −0.176 | −0.176 | −0.176 | −0.266 | −0.253 |
| $p_S \cdot F$ | −0.0128 | −0.0128 | −0.0128 | +0.0064 | +0.0073 |
| $p_S/f_2$ | −0.0032 | −0.0032 | −0.0032 | +0.0016 | +0.0018 |

The foregoing examples may be applied to a variety of purposes, but the following may be instanced as some typical uses for which they may be used.

Thus, Example I is suitable for use as an anamorphotic copying objective for producing an undistorted positive image from a distorted negative area having dimensions, say 0.937 inch horizontally by 0.735 inch vertically, with the picture detail compressed horizontally by the factor 2. With the cylindrical axes vertical, the full dimensions of the resultant positive image would be 1.091 inches horizontally by 0.429 inch vertically, but, since with standard positive film only 0.858 inch is available horizontally corresponding to a 2:1 aspect ratio with the 0.429 inch vertical dimension, part of the picture is masked out. By moving the objective laterally (without disturbing the direction of its optical axis or its focussing position) it would be possible to select the best portion of the complete picture for reproduction.

Example II can be used for producing a distorted positive from an undistorted negative, and if the dimensions of the negative are, say 1.000 horizontally and 0.392 vertically, the distorted positive would have dimensions 0.857 horizontally and 0.672 vertically and could be projected by an anamorphotic projection system on to a screen having an aspect ratio of 2.55 to 1.

Example III is also suitable for producing a distorted image from an undistorted object, and gives image and object dimensions different from those of Example II.

Example IV is a modification designed for a compression ratio of 1.333, but, although having its convergent cylindrical lens in front, has been calculated by way of variant to be suitable for producing a distorted image from an undistorted object. For example, it may be used for producing a distorted positive having dimensions 0.937 horizontally and 0.749 vertically from a large undistorted negative of dimensions 1.460 horizontally and 0.876 vertically. Alternatively, it can be used to produce a distorted positive image with a compression ratio of 2 from a distorted negative having a compression ratio of 1.5.

Example V may be regarded as a variant of Example I having a compression ratio of 1.5, and is suitable for producing an undistorted positive having dimensions of, say, 1.111 horizontally and 0.444 vertically from a distorted negative having dimensions 1.460 horizontally and 0.876 vertically. Only about 0.827 of such width would be recorded with standard positive films to give an aspect ratio of about 1.86:1.

What I claim as my invention and desire to secure by Letters Patent is:

1. An anamorphotic optical system having different magnifications in two mutually perpendicular planes of operation for the same conjugate planes, and comprising two members having cylindrical surfaces whose generators are parallel to one another, one of such members being convergent and the other divergent in the operative plane at right angles to such generators, and a convergent member having spherical surfaces interposed between the two cylindrical members, each cylindrical member being compound and including at least one convergent element and at least one divergent element, the convergent cylindrical member including at least one dispersive internal contact and having its outermost surface remote from the spherical member convex, and the divergent cylindrical member including at least one convergent internal contact and having its innermost surface facing the spherical member concave, whilst the radius of curvature in the operative plane of the outermost surface of the convergent cylindrical member lies between $0.75f_2$ and $1.75f_2$ and that of the innermost surface of the divergent cylindrical member lies between $1.5f_2$ and $1.75f_2$, where $f_2$ is the equivalent focal length of the spherical member.

2. An anamorphotic optical system as claimed in claim 1, in which the arithmetic mean between the positive values of the equivalent focal lengths of the two cylindrical members bears a ratio to the equivalent focal length of the spherical member lying between 0.4 and 1.2 times the ratio of the greater of the two magnifications of the complete system in the two planes to the difference between such magnifications, whilst the axial magnification of the convergent cylindrical member lies between 0.8P and 1.6P and the axial magnification of the divergent cylindrical member lies between 0.6P and 1.2P, where P is the compression or expansion ratio of the complete system.

3. An anamorphotic optical system as claimed in claim 1, in which each cylindrical member is in the form of a doublet, and the Petzval curvature of the internal contact surface in the convergent cylindrical member lies between −0.1 and −0.4 times the sum of the Petzval curvatures of the two outer surfaces of such member, whilst the Petzval curvature of the internal contact surface in the divergent cylindrical member lies between +0.1 and −0.4 times the sum of the Petzval curvatures of the two outer surfaces of such divergent member, the Petzval curvature of a surface being defined by the expression $(n^1-n)/n^1 nr$, where $r$ is the radius of curvature of the surface in the operative plane and $n$ and $n^1$ are the mean refractive indices of the materials on the two sides of such surface.

4. An anamorphotic optical system as claimed in claim 1, in which the sum of the Petzval curvatures of all the surfaces of the spherical member lies between +0.1 and −0.1 times the reciprocal of the equivalent focal length of the spherical member, the Petzval curvature of a surface being defined by the expression $(n^1-n)/n^1 nr$, where $r$ is the radius of curvature of the surface in the operative plane and $n$ and $n^1$ are the mean refractive indices of the materials on the two sides of such surface.

5. An anamorphotic optical system having different magnifications in two mutually perpendicular planes of operation for the same conjugate planes, and comprising two members having cylindrical surfaces whose generators are parallel to one another, one of such members being convergent and the other divergent in the operative plane at right angles to such generators, and a convergent member having spherical surfaces interposed between the two cylindrical members, each cylindrical member comprising a doublet having one convergent element and one divergent element, the internal contact surface in the convergent member being dispersive and having Petzval curvature between −0.1 and −0.4 times the sum of the Petzval curvatures of the two outer surfaces of such member, whilst the internal contact surface in the divergent member is collective and has Petzval curvature between −0.25 and −0.4 times the sum of the Petzval curvatures of the two outer surfaces of such divergent member, the Petzval curvature of a surface being defined by the expression $(n^1-n)/n^1 nr$, where $r$ is the radius of curvature of the surface in the operative plane and $n$ and $n^1$ are the mean refractive indices of the materials on the two sides of such surface.

6. An anamorphotic optical system as claimed in claim 5, in which the arithmetic mean between the positive values of the equivalent focal lengths of the two cylindrical members bears a ratio to the equivalent focal length of the spherical member lying between 0.4 and 1.2 times the ratio of the greater of the two magnifications of the complete system in the two planes to the difference between such magnifications, whilst the axial magnification of the convergent cylindrical member lies between 0.8P and 1.6P and the axial magnification of the divergent cylindrical member lies between 0.6P and 1.2P, where P is the compression or expansion ratio of the complete system.

7. An anamorphotic optical system as claimed in claim 5, in which the sum of the Petzval curvatures of all the surfaces of the spherical member lies between +0.1 and −0.1 times the reciprocal of the equivalent focal length of the spherical member.

8. An anamorphotic optical system as claimed in claim 5, in which the outermost surface of the convergent cylindrical member is convex and has radius of curvature in the operative plane lying between $0.75f_2$ and $1.75f_2$, and the innermost surface of the divergent cylindrical member is concave and has radius of curvature in the operative plane lying between $0.5f_2$ and $1.75f_2$ is the equivalent focal length of the spherical member.

No references cited.